UNITED STATES PATENT OFFICE.

ALBERT WESTLAKE, OF NEW YORK, N. Y.

MOUTH-TABLET.

1,262,888.

Specification of Letters Patent.  Patented Apr. 16, 1918.

No Drawing.    Application filed February 20, 1917. Serial No. 149,762.

*To all whom it may concern:*

Be it known that I, ALBERT WESTLAKE, a citizen of the United States, and a resident of the city, county, and State of New York, have invented certain new and useful Improvements in Mouth-Tablets, of which the following is a specification.

My invention relates to tablets known as self acting and effervescent tablets and belongs to the general class of mouth-tablets described in my patent of Nov. 15, 1910, No. 975,814.

It is important that such tablets should be characterized by the fact that they will dissolve with effervescence in the mouth with a temporary acid reaction, followed by a permanent alkaline reaction, in order that the cleansing of the mouth and teeth shall be accomplished without injury to the gums or enamel.

In the mouth tablet of my said patent the underlying base of the tablet was hydrogen di-oxid which was selected for its antiseptic properties. My present invention is not based at all upon the antiseptic theory but is designed to utilize the fluid secreted and exuded by the salivary glands as a cleaning and strengthening agent for the teeth, curative agent for the mouth generally, and effective aid as to general good health through natural channels.

I have discovered that whatever else may be used or discarded the saliva itself is a natural cleanser and purifier of the mouth and teeth and when present in sufficient quantity and of normally healthy composition may be ranked among the best if not absolutely the best of substances for this purpose.

Owing to the various causes connected with age, health, habits and diet, the daily flow of saliva in most individuals is insufficient either in quantity or quality to enable it to do all the work which nature requires of it.

The object of my invention therefore is to provide a simple, pleasant-tasting, effective, self-acting and effervescent mouth-tablet which will stimulate the action of the salivary and mucous glands, increase the flow of saliva and by its automatic acid reaction, when brought in contact with the saliva, and its subsequent permanent alkaline reaction, will cleanse, purify and strengthen the teeth and other organs of the mouth in general.

To this end I employ as the underlying base of the tablet the fruit acids which are present in lemons, oranges, grapes, grape fruit, pears, apples, etc., and I mix therewith a sufficient quantity of appropriate acid, alkaline, and neutral ingredients to carry the same. I afterward press the mixture into the form of a tablet of suitable size and shape to be readily placed in the mouth. As soon as the saliva begins to attack the tablet, effervescence will set up and continue until the tablet is dissolved. The effervescence at first will show an acid reaction, when tested by litmus paper, but this acid reaction will be replaced, as the effervescence goes on, by an alkaline reaction permanent in character. It will be understood that as fast as the mixture of ingredients is prepared it can be pressed into tablet form by any suitable tablet machine in such quantities as may be desired.

The range of acid, neutral, and alkaline ingredients from which choice may be made is so large that it seems hardly necessary to set forth any specific formula for making the tablets. The main things to be borne in mind in selecting these ingredients are that they should be of such a character as to leave the least possible residue (and preferably none) of gritty, chalky, or insoluble substances when the effervescence ceases and that no substance shall be employed which is in any way injurious to the teeth or gums, such as soapy or alleged curative substances of which the after effects have to be counteracted.

Before making my improved tablet I get ready a suitable amount of fruit acid of the kind selected and taken from the natural fruit itself; preferably by desiccating the pulp.

I then prepare a mixture of suitable ingredients to form a carrier for this fruit acid and mix this carrier with the fruit acid in suitable proportions; stir or otherwise associate these things together until they form an intimate mixture. When these substances are intimately mingled, I turn this mixture into a mass by the addition of water just sufficient for that purpose and press this mass into tablet form.

As illustrations of the proportions of ingredients and method of mixing I give the following three formulas:—

*Formula 1.*

To form the carrier I take equal parts by weight of tartaric acid and citric acid mixing the mass in a mortar. When they seem to be sufficiently mixed and counting them as constituting 5 parts I add 2 parts of sodium citrate and continue the mixing process. To this I add 5 parts of sodium bicarbonate and continue the mixing process. All through the mixing the ingredients are to be kept as dry as possible. To this mixture I then add the fruit acids previously ready in proportions which will vary according to their dryness. These should be made to approximate 5 parts of the carrier mixture to 7 parts of the prepared fruit acid. To this mixture should be added such flavoring matter as taste dictates, preferably a fruit oil corresponding to the fruit of which the acid is used as the base. By supplying water just sufficient to form a mass this mixture is brought in the condition for compression into tablet form.

Formula 2.

In place of a portion of the previously prepared fruit acid, I have some times found it advantageous to employ finely sieved precipitated chalk to reinforce the desiccated pulp but this should be used only sparingly.

Formula 3.

To either Formula 1 or Formula 2, I have found it beneficial at times to add appropriate quantities of desiccated parsley or other condiment ingredients to impart a slight flavor of that kind to the tablet.

Many other formulas will readily suggest themselves to those skilled in the art as the compounder of my tablet is not limited in his choice to the above substances, but may use his own taste in selecting his ingredients.

The main feature of my tablet is that it is based upon substances, preferably fruit acids, which when called into action by contact with saliva will stimulate the flow of the latter in the same way in which the natural fruit would.

In selecting a flavoring for this tablet, the manufacturer would naturally choose the fruit oil which corresponded to the fruit of which he used the pulp, but this is not essential to the effectiveness of my tablet. It will be understood that the purpose of mixing such substances as sodium citrate, tartaric acid, citric acid and sodium bicarbonate or such other acids and alkalis as may be selected to form the carrier for the desiccated fruit pulp is to render said carrier sufficiently tasteless in itself to give full play to the fruit taste which emanates from the desiccated pulp as it softens and disintegrates. This is accomplished by selecting such acids and alkalis as reciprocally soften or neutralize the more or less pungent taste which would characterize each of those substances if used by itself.

I claim:—

A cleansing mouth-tablet compounded of fruit acids and a carrier of alkaline and neutral substances compressed in dry form which will dissolve with effervescence in the mouth to produce at first a temporary acid reaction followed by a relatively permanent alkaline reaction.

ALBERT WESTLAKE.

Witnesses:
W. P. PREBLE,
M. A. DAVEY.